(12) United States Patent
Yu et al.

(10) Patent No.: US 6,409,825 B1
(45) Date of Patent: Jun. 25, 2002

(54) WET GYPSUM ACCELERATOR AND METHODS, COMPOSITION, AND PRODUCT RELATING THERETO

(75) Inventors: Qiang Yu; Srinivas Veeramasuneni, both of Grayslake, IL (US)

(73) Assignee: United States Gypsum Company, Libertyville, IL (US)

( * ) Notice: Subject to any disclaimer, the term of this patent is extended or adjusted under 35 U.S.C. 154(b) by 0 days.

(21) Appl. No.: 09/721,237

(22) Filed: Nov. 22, 2000

(51) Int. Cl.⁷ ............................................. C04B 11/00
(52) U.S. Cl. ..................................... 106/776; 106/772
(58) Field of Search ................................. 106/772, 776

(56) References Cited

U.S. PATENT DOCUMENTS

| | | |
|---|---|---|
| 3,573,947 A | 4/1971 | Kinkade et al. |
| 3,947,285 A | 3/1976 | Jones et al. |
| 4,054,461 A * | 10/1977 | Martin |
| 4,183,908 A * | 1/1980 | Rolfe .......................... 423/555 |
| 5,286,425 A | 2/1994 | Babcock et al. |
| 5,366,547 A | 11/1994 | Brabston et al. |
| 5,560,774 A * | 10/1996 | Burge et al. ................. 106/692 |
| 6,036,740 A * | 3/2000 | Miller et al. .................... 71/32 |

FOREIGN PATENT DOCUMENTS

| | | |
|---|---|---|
| WO | WO 99/08979 | 2/1999 |
| WO | WO 00/06518 | 2/2000 |

* cited by examiner

*Primary Examiner*—Paul Marcantoni
(74) *Attorney, Agent, or Firm*—John M. Lorenzen; David F. Janci; Leydig, Voit & Mayer, Ltd.

(57) ABSTRACT

A wet gypsum accelerator comprising particles of calcium sulfate dihydrate, water, and at least one additive selected from the group consisting of (i) an organic phosphonic compound, (ii) a phosphate-containing compound, or (iii) a mixture of (i) and (ii), is disclosed. Also disclosed are a method of preparing a wet gypsum accelerator, a method of hydrating calcined gypsum to form an interlocking matrix of set gypsum, a set gypsum-containing composition, and a set gypsum-containing product.

11 Claims, No Drawings

WET GYPSUM ACCELERATOR AND METHODS, COMPOSITION, AND PRODUCT RELATING THERETO

TECHNICAL FIELD OF THE INVENTION

The present invention relates generally to gypsum compositions. More particularly, the invention relates to wet gypsum accelerators for accelerating the hydration of calcined gypsum to calcium sulfate dihydrate, as well as to methods, compositions, and products related thereto.

BACKGROUND OF THE INVENTION

Set gypsum (calcium sulfate dihydrate) is a well-known material that is included commonly in many types of products. By way of example, set gypsum is a major component of end products created by the use of traditional plasters, for example, plaster-surfaced internal building walls, and also of gypsum boards employed in typical drywall construction of interior walls and ceilings of buildings. In addition, set gypsum is the major component of gypsum/cellulose fiber composite boards and products, and also is included in products that fill and smooth the joints between edges of gypsum boards. Also, many specialty materials, such as materials useful for modeling and making that are precisely machined, produce products that contain major amounts of set gypsum.

Typically, such gypsum-containing products are prepared by forming a mixture of calcined gypsum, that is, calcium sulfate hemihydrate and/or calcium sulfate anhydrite, and water, as well as other components, as desired. The mixture typically is cast into a predetermined shape or onto the surface of a substrate. The calcined gypsum reacts with water to form a matrix of crystalline hydrated gypsum or calcium sulfate dihydrate. It is the desired hydration of the calcined gypsum that enables the formation of an interlocking matrix of set gypsum crystals, thereby imparting strength to the gypsum structure in the gypsum-containing product. Mild heating can be used to drive off unreacted water to yield a dry product.

Regardless of the type of gypsum-containing product being made, accelerator materials commonly are included in the mixture comprising calcined gypsum and water in order to enhance the efficiency of hydration and to control set time. Typically, the accelerator material includes finely ground dry calcium sulfate dihydrate, commonly referred to as "gypsum seeds," which generally have a median particle size smaller than about 25 $\mu$m. Even smaller particles are preferred, for example, having a median particle size below about 10 $\mu$m, because the efficiency of the gypsum seeds in accelerating the rate of hydration increases as the particles become finer. The gypsum seeds enhance nucleation of the set gypsum crystals, thereby increasing the crystallization rate thereof. As is known in the art, gypsum seed accelerator materials progressively lose their effectiveness upon aging, even under normal conditions. In this respect, some efficiency of the accelerator is lost even as it is ground, and the gypsum seeds dramatically lose potency over time during handling or storage. The loss of acceleration efficiency of conventional accelerator materials is exacerbated when the accelerator is exposed to heat and/or moisture.

To combat the loss of efficiency of the gypsum seeds over time, particularly under conditions of heat, it is customary to coat the calcium sulfate dihydrate accelerator material with any of a number of known coating agents, such as, for example, sugars, including sucrose, dextrose and the like, starch, boric acid, or long chained fatty carboxylic acids including salts thereof. Conventional heat resistant accelerator materials are both ground and provided in dry form inasmuch as accelerator loses efficiency upon contact with moisture, for example, because the accelerator particles undesirably agglomerate and/or because the coating agents often are soluble in water.

Existing approaches for extending the longevity of gypsum seed accelerator materials have not been fully satisfactory. In particular, despite the availability of the foregoing approaches, conventional accelerator materials still can be stored only for a few days such that the accelerator material must be prepared freshly a short time prior to use. Accordingly, conventional accelerator materials cannot be stored for more than a few hours or transported over long distances and then used. Furthermore, conventional accelerator materials are relatively expensive to make because commonly used additives, such as sugar, typically are included in relatively large amounts, such as, for example, about 5% by weight of the accelerator material. The expense in manufacturing set gypsum-containing products often is increased further in conventional manufacturing processes because a second accelerator material, such as potash or aluminum sulfate, typically is included to enhance crystal growth after nucleation in order to compensate for the loss of efficiency of the gypsum seeds.

In addition, conventional accelerator materials lose their effectiveness upon exposure to moisture and, thus, must remain in a dry environment prior to use. As such, conventional heat-resistant accelerator materials cannot be used at all, or, if used, require special precautions, in the manufacture of certain set gypsum-containing products that are made using a wet mixing process, as opposed to a dry feed system. By way of example, a wet mixing process is utilized in the preparation of gypsum-cellulosic fiber composite panels. Particularly, water and calcined gypsum are wet mixed and allowed to penetrate a porous cellulosic fiber structure such that, after hydration, set gypsum forms in situ within the pores of the cellulosic fibers to enhance the strength of the composite. Conventional heat resistant accelerators generally are not utilized in such a wet mixed process because the efficiency of the wet gypsum accelerator is compromised due to extended exposure to water.

Accordingly, it will be appreciated from the foregoing that there is a need in the art for an accelerator material that does not lose its effectiveness over long periods of time, even upon exposure to heat and/or moisture, and which uses relatively small amounts of additives such that the manufacture of the accelerator material is relatively inexpensive.

BRIEF SUMMARY OF THE INVENTION

The present invention provides a wet gypsum accelerator, a method of preparing a wet gypsum accelerator, a method of hydrating calcined gypsum to form an interlocking matrix of set gypsum, a set gypsum-containing composition, and a set gypsum-containing product.

The wet gypsum accelerator of the invention comprises particles of calcium sulfate dihydrate, water, and at least one additive elected from (i) an organic phosphonic compound; (ii) a phosphate-containing compound; or (iii) a mixture of (i) and (ii). The wet gypsum accelerator preferably is prepared via wet grinding. Water, the additive, and gypsum are combined (in any order) to form a mixture, with other optional components added, as desired. When combined with the water, the gypsum can be in the form of calcium sulfate dihydrate, or alternatively, at least some of the gypsum can be in the form of calcined gypsum, that is, calcium sulfate hemihydrate and/or calcium sulfate anhydrite, such that the calcined gypsum is converted to calcium sulfate dihydrate in the presence of the water, with excess water being required in the mixture to accommodate the wet grinding. Preferably, the gypsum is in the form of calcium sulfate dihydrate when grinding is initiated, but grinding can begin before all of the calcined gypsum is converted to calcium sulfate dihydrate. The calcium sulfate dihydrate is wet ground in the presence of the additive to form the wet gypsum accelerator.

The wet gypsum accelerator according to the invention is used to facilitate the preparation of a set gypsum-containing composition, as well as a product comprising the set gypsum-containing composition. In particular, the wet gypsum accelerator of the invention can be combined with water and calcined gypsum (in any order) to form an aqueous mixture in which the calcined gypsum is hydrated to form an interlocking matrix of set gypsum. In accordance with the present invention, the wet gypsum accelerator enhances efficiency in making set gypsum-containing compositions and products by increasing the rate of hydration of the calcined gypsum to form the interlocking matrix of set gypsum. The invention is useful in the manufacture of any of a variety of set gypsum-containing products formed from calcined gypsum, such as, but not limited to, ceiling materials, board such as wallboard, plaster, joint compounds, flooring materials, specialty materials, and the like.

Advantageously, the wet gypsum accelerator of the invention exhibits substantial longevity and maintains its effectiveness over time such that the wet gypsum accelerator can be made, stored, and even transported over long distances, prior to use. Desirably, the wet gypsum accelerator also is heat and/or moisture resistant such that it maintains all or most of its effectiveness even upon exposure thereto. In preferred embodiments, the invention also reduces manufacturing costs because the additives preferably are provided in relatively small amounts. The invention reduces manufacturing expense further because a second accelerator material, such as potash or aluminum sulfate, generally is not required because the wet gypsum accelerator maintains its efficiency over time and upon exposure to moisture. Nevertheless, second accelerator materials can be utilized if desired. The invention also facilitates ease and efficiency of manufacture by permitting wet mixing of the accelerator with calcined gypsum and other components used in making certain set gypsum-containing products, such as, but not limited to, gypsum-cellulosic fiber wallboard.

These and other advantages of the present invention, as well as additional inventive features, will be apparent from the description of the invention. The invention may best be understood with reference to the following detailed description of the preferred embodiments.

DETAILED DESCRIPTION OF THE PREFERRED EMBODIMENTS

The present invention provides a wet gypsum accelerator comprising calcium sulfate dihydrate, water, and an additive selected from an organic phosphonic compound; a phosphate-containing compound; or a mixture of an organic phosphonic compound and a phosphate-containing compound. Of course, more than one of each type of additive can be used in the practice of the invention. It is noteworthy that the benefits achieved by the wet gypsum accelerator of the invention, as described herein, are surprising and unexpected, particularly because moisture has had a negative effect on the efficiency of conventional accelerator materials and because most phosphates and phosphonates have been shown to be retardive to set gypsum formation.

Preferably, the inventive wet gypsum accelerator is prepared by wet grinding the calcium sulfate dihydrate in the presence of additive. Once it is prepared, the wet gypsum accelerator of the invention is used to enhance efficiency in the manufacture of a set gypsum-containing product. In this respect, the wet gypsum accelerator is combined with calcined gypsum and water, as well as other components as desired, to form a mixture that is cast into a predetermined shape or onto a substrate surface, during manufacture of the set gypsum-containing product. The calcined gypsum reacts with the water to form the crystalline hydrated gypsum, that is, calcium sulfate dihydrate. Inclusion of the wet gypsum accelerator of the invention in the mixture of calcined gypsum and water enhances the rate of, and predictability in the time required for, the hydration from calcined gypsum to the calcium sulfate dihydrate of the desired set gypsum-containing product. It is believed that the wet gypsum accelerator of the invention facilitates nucleation such that the rate of crystallization of the resulting interlocking matrix of set gypsum is increased. The wet gypsum accelerator of the invention can be used in making any of a variety of set gypsum-containing products, such as, for example, conventional gypsum board or gypsum-cellulosic fiber wallboard such as FIBEROCK® composite panels, commercially available from USG Corporation, as well as ceiling materials, flooring materials, joint compounds, plasters, specialty products, and the like.

The wet gypsum accelerator according to the invention exhibits substantial longevity such that it maintains all or most of its effectiveness over long periods of time. Preferably, the wet gypsum accelerator of the invention maintains all or most of its effectiveness for at least several weeks, and more preferably, for at least a few months, for example, three months, and still more preferably, for at least six months, or even longer. As a result, the wet gypsum accelerator can be prepared and then stored and/or transported, even over long distances, prior to use. The wet gypsum accelerator of the invention preferably remains effective even upon exposure to elevated temperatures and/or moisture. Also, because the inventive wet gypsum accelerator maintains its efficiency over time, even upon exposure to moisture, a second accelerator material, such as potash or aluminum sulfate, is not required in the practice of the invention, although the second accelerator material can be included if desired. Furthermore, the wet gypsum accelerator according to the invention can be used in making set gypsum-containing products that are made via a dry feed system, as well as set gypsum-containing products prepared using a wet mixing system, such as, for example, the process for making gypsum-cellulosic fiber composite boards and the like.

The wet gypsum accelerator according to the invention preferably is prepared in a wet grinding method. In particular, gypsum, water, and at least one additive are combined to form a mixture. In some embodiments, gypsum used to form the mixture for wet grinding is calcium sulfate dihydrate. In other embodiments, the gypsum can be in the form of calcined gypsum when it is combined with the water, such that the calcined gypsum reacts with a portion of the water to form calcium sulfate dihydrate. Preferably, the gypsum is in the form of calcium sulfate dihydrate when the wet grinding commences, but all of the calcined gypsum need not be converted to calcium sulfate dihydrate when wet grinding begins. A sufficient amount of water beyond that which is required to react with the calcined gypsum preferably is included in the mixture to accommodate the wet grinding step after the calcium sulfate dihydrate is formed. In such cases, the additive preferably is added after most, and more preferably, all of the calcium sulfate dihydrate is formed so as to maximize its presence on the surface of the resulting wet gypsum accelerator.

The calcium sulfate dihydrate, as combined with the water or after it is formed in the water from calcined gypsum, is wet ground, by techniques that will be apparent to one of ordinary skill in the art, in the presence of the additive component to form the wet gypsum accelerator. By way of example, the mixture comprising calcium sulfate dihydrate, water, and additive can be milled under conditions sufficient to provide a slurry in which the calcium sulfate dihydrate particles have a median particle size of less than about 5 $\mu$m. Preferably, the calcium sulfate dihydrate particles have a surface area of at least about 7,000 cm$^2$/gram. A general procedure for milling is provided, for example, in U.S. Pat. No. 3,573,947. It will be appreciated that heating is not necessary to make the wet gypsum accelerator of the invention. Fine grinding, as will be appreciated by one of ordinary skill in the art, is preferred to maximize the effect of the wet gypsum accelerator on nucleation of the set gypsum crystals. The calcium sulfate dihydrate particles can be ground to any suitable size, preferably, having a median particle diameter of about 25 $\mu$m or less, more preferably, about 10 $\mu$m or less, and even more preferably, about 5 $\mu$m or less.

The wet gypsum accelerator of the invention can be used in the preparation of set gypsum products prepared by any of the variety of processes known in the art by adding the wet gypsum accelerator to an aqueous calcined gypsum mixture in an amount effective to accelerate and/or control the rate of conversion of the calcined gypsum mixture to set gypsum. In this respect, the present invention provides a wet gypsum accelerator that increases the rate of hydration of the calcined gypsum as compared with the time required for hydration absent any accelerator material. Typically, the rate of hydration is evaluated on the basis of the "Time to 50% Hydration." For example, because the hydration of calcined gypsum to set gypsum is an exothermic process, the Time to 50% Hydration can be calculated by determining the temperature increase caused by the hydration and then measuring the amount of time required to generate the temperature rise. The mid-point in time has been found to correspond to the Time to 50% Hydration, as is known to those skilled in the art. Preferably, pursuant to the invention, the wet gypsum accelerator reduces the Time to 50% Hydration of the calcined gypsum to about 9 minutes or less, more preferably 8 minutes or less. Even more preferably, the wet gypsum accelerator reduces the Time to 50% Hydration of the calcined gypsum to about 5 minutes or less.

The amount of wet gypsum accelerator added to an aqueous calcined gypsum mixture will depend on the components of the aqueous calcined gypsum mixture, such as the inclusion of set retarders, dispersants, foam, starch, paper fiber, and the like. By way of example, the inventive wet gypsum accelerator can be provided in an amount of from about 0.05% to about 3% by weight of the aqueous calcined gypsum mixture, more preferably, in an amount of from about 0.5% to about 1.5% by weight of the aqueous calcined gypsum mixture.

The calcined gypsum used to prepare the calcium sulfate dihydrate included in the wet gypsum accelerator of the invention can be in the form of calcium sulfate alpha hemihydrate, calcium sulfate beta hemihydrate, water-soluble calcium sulfate anhydrite, or mixtures of these various forms of calcium sulfate hemihydrates and anhydrites. The calcined gypsum can be fibrous or non-fibrous. Furthermore, the wet gypsum accelerator of the invention can be used to accelerate hydration of calcined gypsum of any of these forms of calcium sulfate hemihydrates and anhydrites as well as mixtures of the various forms of calcium sulfate hemihydrates and anhydrites.

While not wishing to be bound by any particular theory, it is believed that, upon grinding, the desired additives according to the invention become affixed to the freshly generated outer surface of the calcium sulfate dihydrate, providing at least a partial coating on the calcium sulfate dihydrate. It also is believed that the additives strongly and rapidly adsorb on active sites of the calcium sulfate dihydrate surface of the accelerator, where unwanted recrystallization can otherwise occur. As a result, it also is believed that by adsorbing on such active sites, the additives protect the size and shape of the active sites to prevent gypsum recrystallization of the ground gypsum upon exposure to heat and/or moisture and to protect the active sites of the ground gypsum during the wet grinding process itself.

The organic phosphonic compounds, such as, for example, organic phosphonates or phosphonic acids, in accordance with of the invention, include at least one RPO$_3$M$_2$ functional group, where M is a cation, phosphorus, or hydrogen, and R is an organic group. The use of an organic polyphosphonic compound is preferred, although an organic monophosphonic compound can be utilized as well according to the invention. The preferred organic polyphosphonic compounds include at least two phosphonate salt or ion groups, at least two phosphonic acid groups, or at least one phosphonate salt or ion group and at least one phosphonic acid group. A monophosphonic compound according to the invention includes one phosphonate salt or ion group or at least one phosphonic acid group.

The organic group of the organic phosphonic compounds is bonded directly to the phosphorus (i.e., without an oxygen in between). By way of example, the organic phosphonic compounds suitable for use in the invention include, but are not limited to, compounds characterized by the following structures:

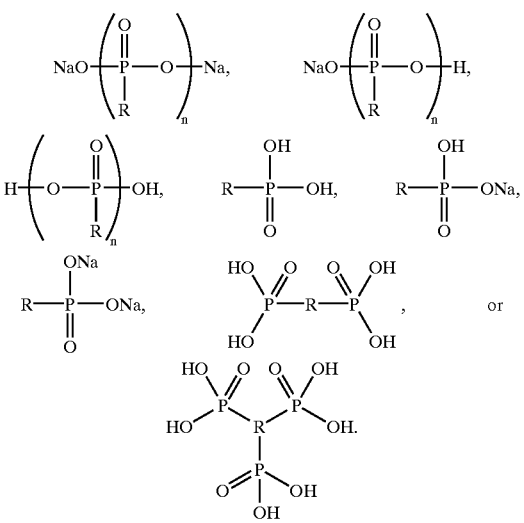

In these structures, R refers to an organic moiety containing at least one carbon atom bonded directly to a phosphorus atom P, and n is a number of from about 1 to about 1,000, preferably a number of from about 2 to about 50.

Organic phosphonic compounds include, for example, aminotri (methylene-phosphonic acid), aminotri (methylene-phosphonic acid), 1-hydroxyethylidene-1,1-diphosphonic acid, 1-hydroxyethylidene-1,1-diphosphonic acid, diethylenetriamine penta(methylene phosphonic acid), diethylenetriamine penta(methylene phosphonic acid), hexamethylene diamine tetra(methylene phosphonic acid), hexamethylene diamine tetra(methylene phosphonic acid), as well as any suitable salt thereof, such as, for example, a pentasodium salt, tetrasodium salt, trisodium salt, potassium salt, sodium salt, ammonium salt, calcium salt or magnesium salt of any of the foregoing acids, and the like, or combinations of the foregoing salts and/or acids. In some embodiments, DEQUEST® phosphonates (e.g., DEQUEST® 2000, DEQUEST® 2006, DEQUEST® 2016, DEQUEST® 2054, DEQUEST® 2060S, DEQUEST® 2066A, and the like), commercially available from Solutia, Inc., St. Louis, Mo., are utilized in the invention. Other examples of suitable organic phosphonic compounds are found, for example, in U.S. Pat. No. 5,788,857.

Referring now to the phosphate-containing compound, any suitable phosphate-containing compound providing a benefit of the invention can be utilized. By way of example, the phosphate-containing compound can be an orthophosphate or a polyphosphate, and furthermore, the phosphate-containing compound can be in the form of an ion, salt, or acid.

Suitable examples of these classes of phosphates according to the invention will be apparent to those skilled in the art. For example, any suitable orthophosphate-containing compound can be utilized in the practice of the invention, including, but not limited to, monobasic phosphate salts such as monoammonium phosphate, monosodium phosphate, monopotassium phosphate, or combinations thereof. A preferred monobasic phosphate salt is monoammonium phosphate. Polybasic orthophosphates also can be utilized in accordance with the invention.

Similarly, any suitable polyphosphate salt can be used in accordance with the present invention. The polyphosphate can be cyclic or acyclic. Exemplary cyclic polyphosphates include, for example, trimetaphosphate salts, including double salts, that is, trimetaphosphate salts having two cations. The trimetaphosphate salt can be selected, for example, from sodium trimetaphosphate, potassium trimetaphosphate, calcium trimetaphosphate, sodium calcium trimetaphosphate, lithium trimetaphosphate, ammonium trimetaphosphate, aluminum trimetaphosphate, and the like, or combinations thereof. Sodium trimetaphosphate is a preferred trimetaphosphate salt. Also, any suitable acyclic polyphosphate salt can be utilized in accordance with the present invention. Preferably, the acyclic polyphosphate salt has at least two phosphate units. By way of example, suitable acyclic polyphosphate salts in accordance with the present invention include, but are not limited to, pyrophosphates, tripolyphosphates, sodium hexametaphosphate having from about 6 to about 27 repeating phosphate units, potassium hexametaphosphate having from about 6 to about 27 repeating phosphate units, ammonium hexametaphosphate having from about 6 to about 27 repeating phosphate units, and combinations thereof. A preferred acyclic polyphosphate salt pursuant to the present invention is commercially available as CALGON® from Solutia, Inc., St. Louis, Mo., which is a sodium hexametaphosphate having from about 6 to about 27 repeating phosphate units. In addition, the phosphate-containing compound can be in the acid form of any of the foregoing salts. The acid can be, for example, a phosphoric acid or polyphosphoric acid.

Preferably, the phosphate-containing compound is selected from the group consisting of tetrapotassium pyrophosphate, sodium acid pyrophosphate, sodium tripolyphosphate, tetrasodium pyrophosphate, sodium potassium tripolyphosphate, sodium hexametaphosphate salt having from 6 to about 27 phosphate units, ammonium polyphosphate, sodium trimetaphosphate, and combinations thereof.

The ingredients in the wet gypsum accelerator of the invention can be provided in any suitable amount. For example, the calcium sulfate dihydrate can be provided in an amount of at least about 40% by weight of the accelerator, preferably, at least about 50% by weight of the accelerator. The water can be present, for example, in an amount of from about 40% to about 55% by weight of the accelerator, more preferably, in an amount of from about 45% to about 50% by weight of the accelerator.

The additive preferably is provided in as low of an amount as possible to minimize cost, while still achieving the desired benefits of enhancing longevity, such that the efficiency of the inventive wet gypsum accelerator is maintained over time, and withstanding exposure to heat and/or moisture. Preferably, the additive component whether a single additive or a combination of additives is provided in an amount of from about 0.1% to about 10% by weight of the accelerator, more preferably, in an amount of from about 0.1% to about 2% by weight of the accelerator, and even more preferably, in an amount of from about 0.1% to about 1% by weight of the accelerator.

In preferred embodiments, at least one organic phosphonic compound is utilized as an additive. Organic phosphonic compounds generally are superior in enhancing the efficiency of the accelerator, even when included in relatively small amounts. More preferably, at least one phosphate-containing compound is used in combination with at least one organic phosphonic compound. For example, it is believed that, depending upon the size and shape of various active sites, the organic phosphonic compound can enhance nucleation at some active sites while the phosphate-containing compound can act at other sites such that the combination is desirable. Furthermore, in preferred embodiments, the phosphate containing compound, particularly a cyclic compounds such as a trimetaphosphate compound (including ions and salts) is added in conjunction with the organic phosphonic compound to enhance resistance to aging. It is believed that the inclusion of the phosphate-containing compound stabilizes and maintains the wet strength of the accelerator to improve aging properties of the accelerator.

In embodiments of the invention comprising more than one additive, each additive preferably is included in an amount suitable to achieve the longevity and/or the desired Time to 50% hydration, but preferably, the total amount of additive falls within the ranges described above. For example, in embodiments where at least one phosphate containing compound is used in combination with at least one organic phosphonic compound, the organic phosphonic compound preferably is included in an amount of from about 0.05% to about 9.95% by weight of the accelerator, and the phosphate-containing compound likewise preferably is present in an amount of from about 0.05% to about 9.95% by weight of the accelerator.

As an added benefit of the invention, the wet gypsum accelerator can be utilized as a means to provide the organic phosphonic compound and/or inorganic phosphate compound as a pre-treatment to enhance various properties of the resulting set gypsum-containing composition and product, for example, wallboard, ceiling tiles, and the like, such as, for example, strength, dimensional stability, resistance to permanent deformation, and the like, as described in commonly assigned U.S. application Ser. No. 08/916,058 (abandoned) and commonly assigned co-pending U.S. application Ser. Nos. 09/138,355; 09/249,814; and 09/557,721, hereby incorporated in their entireties by reference.

The following examples further illustrate the present invention but should not be construed as in any way limiting its scope. In the examples described below, the following abbreviations have the indicated meanings:

| | |
|---|---|
| NaTMP | is sodium trimetaphosphate; |
| OPPC | denotes an organic polyphosphonic compound; |
| OPPC1 | is aminotri (methylene-phosphonic acid); |
| OPPC2 | is aminotri (methylene-phosphonic acid), pentasodium salt; |
| OPPC3 | is 1-hydroxyethylidene-1,1-diphosphonic acid tetrasodium salt; |
| OPPC4 | is hexamethylenediamine tetra (methylene phosphonic acid), potassium salt; |
| OPPC5 | is diethylenetriamine penta (methylene phosphonic acid); and |
| OPPC6 | is diethylenetriamine penta (methylene phosphonic acid), trisodium salt. |

EXAMPLE 1

RATE OF HYDRATION

This Example illustrates the preparation of the wet gypsum accelerator and demonstrates the enhanced rate of hydration resulting from the use of the wet gypsum accelerator of the invention as compared with other wet gypsum accelerators.

To prepare each wet gypsum accelerator, a four-cylinder planetary ball mill was used for initial wet grinding of landplaster (calcium sulfate dihydrate) from United States Gypsum Company's Southard plant in the presence of one or more additives, as specified in Table 1. For each wet gypsum accelerator (WGA) preparation, 30 ml of deionized water, 30 grams of calcium sulfate dihydrate, and the specified amounts of additive were ground for 30 minutes at 175 rpm in a stainless steel cylinder containing 30 stainless steel balls each having a diameter of 0.5 inch.

Each of the wet gypsum accelerator formulations was then tested to determine rate of hydration. For each test, 500 grams of calcium sulfate hemihydrate (United States Gypsum Company's Southard plant) was measured and set aside. Three grams of (a) WGA or (b) a set accelerator powder comprising fine ground particles of calcium sulfate dihydrate coated with sugar to maintain efficiency and heated as described in U.S. Pat. No. 3,573,947 (the disclosure of which is hereby incorporated by reference), herein referred to as a "climate stabilized accelerator" (CSA), were blended with calcium sulfate hemihydrate powder until all were thoroughly dispersed. A 500 ml quantity of water at 70° F. was measured and poured into a Waring blender with high sheer blades. The powdered mixture was allowed to soak for 15 seconds, then blended on high speed for 30 seconds to form a slurry.

The slurry was poured into a cup, which was then placed into an insulated styrofoam container to minimize heat loss to the environment during the hydration reaction. A temperature probe was placed into the middle of the slurry, and the temperature was recorded every 5 seconds. Since the setting reaction is exothermic, the extent of the reaction was measured by the temperature rise. The Time to 50% hydration was determined to be the time to reach the temperature half way between the minimum and maximum temperatures recorded during the test. The results are provided in Table 1.

TABLE 1

Wet gypsum accelerator preparation and evaluation

| | | WGA Preparation | Bench Scale TRS Evaluation | | | |
|---|---|---|---|---|---|---|
| Ex # | Chemicals | Additive level (Wt %) | Time to 50% hydration | Time to 98% hydration | Initial slurry temp (° F.) | Total temp rise (° F.) |
| 1 | Control (Land Plaster) | 0 | 13 | 19.83 | 75.3 | 32.9 |
| 2 | Maltodextrin | 3.3 | 13.5 | 20.33 | 72.8 | 33.2 |
| | | 6.7 | 13.67 | 20.5 | 72.3 | 32.7 |
| | | 10 | 13.17 | 19.33 | 71.4 | 32.7 |
| 3 | HCl | 3.3 | 12.92 | 19.33 | 74.1 | 30.9 |
| | | 6.7 | 14.33 | 21.17 | 74.5 | 32.1 |
| | | 10 | 15 | 22 | 73.2 | 33.7 |
| 4 | H2S04 | 3.3 | 14.17 | 21.25 | 73.1 | 34.2 |
| | | 6.7 | 14.08 | 21.75 | 73.8 | 34.2 |
| | | 10 | 14.83 | 22.17 | 73 | 34.3 |
| 5 | NaCl | 3.3 | 15.17 | 22.17 | 73.8 | 33.3 |
| | | 6.7 | 15.67 | 22.33 | 74.2 | 31.4 |
| | | 10 | 15.08 | 21.92 | 73.4 | 31.4 |
| 6 | CaCl2 | 3.3 | 13.33 | 20.75 | 74.5 | 31.3 |
| | | 6.7 | 14.25 | 20.83 | 74.5 | 31.4 |
| | | 10 | 14.58 | 21.42 | 73 | 33.9 |
| 7 | KCl | 3.3 | 14.58 | 21.25 | 76.2 | 32.4 |
| | | 6.7 | 15 | 21.58 | 76.1 | 33.6 |
| | | 10 | 15.67 | 22.17 | 75.2 | 33.5 |
| 8 | Glycine | 3.3 | 11.83 | 18.75 | 74.7 | 32.8 |
| | | 6.7 | 12.25 | 18.83 | 74.9 | 29 |
| | | 10 | 13.92 | 21.25 | 73.5 | 32 |
| 9 | Rochelle Salt | 3.3 | 11.92 | 19.25 | 73.5 | 31.6 |
| | | 6.7 | 14.17 | 21 | 73.7 | 30.8 |
| | | 10 | 15.58 | 23.17 | 72.8 | 33.2 |
| 10 | Citric Acid | 3.3 | 14.67 | 21.58 | 75.9 | 29.5 |
| | | 6.7 | 18.42 | 25.92 | 77.8 | 31.9 |
| | | 10 | 28.5 | 36.42 | 77.4 | 31.2 |
| 11 | Soap | 3.3 | 11.58 | 18.08 | 75.1 | 30.7 |
| | | 6.7 | 12 | 18.58 | 75 | 30.9 |
| | | 10 | 14.5 | 21.33 | 74.2 | 28.8 |
| 12 | Sodium D-Gluconate | 3.3 | 11.83 | 18.33 | 77.8 | 31.5 |
| | | 6.7 | 13.17 | 20.08 | 78.3 | 32.5 |
| | | 10 | 14.67 | 21.67 | 76.7 | 33.5 |
| 13 | Disol | 6.7 | 9.5 | 15.83 | 72.8 | 33.2 |
| | | 10 | 9.33 | 16.33 | 71.8 | 34.5 |
| 14 | Sodium Lignosulfonate | 3.3 | 8.42 | 14.33 | 78.4 | 31.3 |
| | | 6.7 | 9.17 | 15.5 | 74.5 | 32.1 |
| | | 10 | 10.17 | 17.17 | 72.2 | 34.2 |
| 15 | Monosodium Glutamate | 3.3 | 11.17 | 17.67 | 73.7 | 32.6 |
| | | 6.7 | 11.5 | 18.33 | 73.5 | 32.6 |
| | | 10 | 12.33 | 19.83 | 72.4 | 33.5 |
| 16 | Sodium Sulfate | 3.3 | 15 | 21.58 | 79 | 30 |
| | | 6.7 | 15.5 | 22.83 | 79.5 | 33.2 |
| | | 10 | 16 | 23.33 | 78.8 | 32.7 |
| 17 | Sodium Bisulfate | 3.3 | 15 | 21.75 | 72 | 30.5 |
| | | 6.7 | 15.67 | 23.33 | 72.4 | 32.9 |
| | | 10 | 17.25 | 24.83 | 71.8 | 34.3 |
| 18 | Dicalcium Phosphate | 3.3 | 6.33 | 11.83 | 73.8 | 34.2 |
| | | 6.7 | 6.58 | 12.67 | 74 | 33.3 |
| | | 10 | 6.33 | 12.58 | 73.2 | 35.5 |
| 19 | Bone Ash | 3.3 | 11.5 | 18.92 | 69.5 | 33 |
| | | 6.7 | 10.83 | 17.83 | 70.2 | 34.4 |
| | | 10 | 10.75 | 17.75 | 69.6 | 35.1 |
| 20 | Calcium Phosphate | 3.3 | 11.42 | 18.5 | 68.4 | 34.4 |
| | | 6.7 | 11.75 | 19.08 | 69.5 | 34.3 |
| | | 10 | 11.25 | 18 | 69.1 | 34.3 |
| 21 | Monosodium Phosphate | 3.3 | 8.42 | 14.92 | 69.1 | 34.1 |
| | | 6.7 | 7.67 | 13.67 | 69.4 | 34.4 |
| | | 10 | 7.42 | 13.67 | 68.9 | 35.1 |
| 22 | Trisodium Phosphate | 3.3 | 9.92 | 16.67 | 69.1 | 34.4 |
| | | 6.7 | 11.92 | 18.75 | 69.7 | 34.4 |
| | | 10 | 14.5 | 21.58 | 69.2 | 34.8 |

TABLE 1-continued

Wet gypsum accelerator preparation and evaluation

| | | WGA Preparation | Bench Scale TRS Evaluation | | |
|---|---|---|---|---|---|
| Ex # | Chemicals | Additive level (Wt %) | Time to 50% hydration | Time to 98% hydration | Initial slurry temp (° F.) | Total temp rise (° F.) |
| 23 | Ammonium Phosphate | 3.3 | 8.92 | 15.5 | 69.8 | 34.2 |
| | | 6.7 | 9.08 | 15.92 | 70.8 | 33.8 |
| | | 10 | 8.08 | 15 | 69.7 | 34.1 |
| 24 | Tricalcium Phosphate | 3.3 | 12.5 | 19.5 | 69.5 | 33.5 |
| | | 6.7 | 12.25 | 19.92 | 69.8 | 34.2 |
| | | 10 | 12.08 | 19.33 | 69.5 | 33.3 |
| 25 | Calcium Pyrophosphate | 3.3 | 10.25 | 17.08 | 69.8 | 34.6 |
| | | 6.7 | 9.33 | 16 | 70.4 | 34.9 |
| | | 10 | 8.08 | 14.33 | 69.6 | 34.5 |
| 26 | Tetrapotassium Pyrophosphate | 3.3 | 4.75 | 10.25 | 68.7 | 35 |
| | | 6.7 | 5.25 | 10.83 | 69.7 | 35.7 |
| | | 10 | 6.33 | 11.58 | 69.4 | 33.9 |
| 27 | Sodium Acid Pyrophosphate | 3.3 | 4.42 | 10 | 67.9 | 35.8 |
| | | 6.7 | 5.5 | 11.83 | 69.1 | 35.4 |
| | | 10 | 6.5 | 12.67 | 68.6 | 34.3 |
| 28 | Sodium Tripolyphosphate | 3.3 | 5.08 | 11.08 | 68.6 | 35.1 |
| | | 6.7 | 6 | 12.08 | 69.4 | 35.1 |
| | | 10 | 7.58 | 13.92 | 69 | 34.8 |
| 29 | Tetrasodium Pyrophosphate | 3.3 | 4.58 | 10.08 | 68.1 | 34.2 |
| | | 6.7 | 5.25 | 11.08 | 69.1 | 35.4 |
| | | 10 | 5.75 | 11.83 | 68.6 | 34.5 |
| 30 | Sodium Potassium Tripolyphosphate | 3.3 | 4.92 | 10.08 | 68.3 | 33.8 |
| | | 6.7 | 5.92 | 11.83 | 69.2 | 34.5 |
| | | 10 | 7.17 | 14 | 68.8 | 34 |
| 31 | Monoammonium Phosphate Anhydrous | 3.3 | 8.33 | 15 | 69.7 | 35.1 |
| | | 6.7 | 8.25 | 14.58 | 69.9 | 35.6 |
| | | 10 | 8.5 | 14.75 | 69.1 | 34.6 |
| 32 | Diammonium Phosphate Anhydrous | 3.3 | 8.5 | 15.08 | 69.5 | 34.9 |
| | | 6.7 | 8 | 14.33 | 70 | 34.4 |
| | | 10 | 6.67 | 12.75 | 69 | 35.8 |
| 33 | Disodium Phosphate | 3.3 | 8.58 | 15 | 69.1 | 34.4 |
| | | 6.7 | 8.17 | 15.33 | 69.6 | 33.6 |
| | | 10 | 7.42 | 13.67 | 68.9 | 34.4 |
| 34 | Phosphate Glass | 3.3 | 5.75 | 11.58 | 69.5 | 34.9 |
| | | 6.7 | 4.92 | 11 | 69.6 | 36.2 |
| | | 10 | 5.33 | 11.25 | 69.2 | 36 |
| 35 | Ammonium Polyphosphate | 3.3 | 6.5 | 12.83 | 70.2 | 34.4 |
| | | 6.7 | 13 | 18.75 | 70.9 | 33 |
| | | 10 | 16.75 | 23.5 | 71.9 | 33.3 |
| 36 | Polyphosphoric acid | 3.3 | 6.08 | 12.42 | 69.5 | 34.7 |
| | | 6.7 | 7.17 | 14.25 | 70.6 | 34.8 |
| | | 10 | 8.75 | 16.92 | 70.4 | 34.5 |
| 37 | Sodium Hexa- metaphosphate | 0.4 | 4.17 | 9.33 | 71.3 | 35.6 |
| | | 0.9 | 6.92 | 12.42 | 73 | 34.3 |
| | | 1.7 | 9.67 | 14.83 | 72.2 | 33.7 |
| 38 | Sodium Trimetaphosphate | 3.3 | 15.83 | 21.67 | 74.3 | 33 |
| | | 6.7 | 18.25 | 24.42 | 73.5 | 32.7 |
| | | 3.3 | 6.75 | 12.5 | 76.2 | 29.3 |
| | | 6.7 | 5.83 | 12.33 | 75.4 | 34.8 |
| | | 10 | 4.67 | 11 | 74.7 | 34.4 |
| 39 | OPPC4 | 0.2 | 6 | | | |
| | | 0.4 | 4.25 | | | |
| | | 0.9 | 3.83 | | | |
| | | 1.7 | 4.5 | | | |
| | | 3.3 | 4.75 | 10.42 | 68.8 | 35.2 |
| | | 6.7 | 5.92 | 11.75 | 69.9 | 34.8 |
| | | 10 | 7.67 | 14 | 69.5 | 34.1 |
| 40 | OPPC1 | 3.3 | 6.25 | 12.58 | 69.7 | 34.7 |
| | | 6.7 | 7.17 | 14.33 | 70.4 | 34.6 |
| | | 10 | 8.75 | 16.5 | 69.8 | 34.4 |
| 42 | OPPC2 | 0.2 | 5.33 | | | |
| | | 0.4 | 3.75 | | | |
| | | 0.9 | 3.42 | | | |
| | | 1.7 | 3.58 | | | |
| | | 3.3 | 4.58 | 10.17 | 70.3 | 34.7 |
| | | 6.7 | 4.67 | 9.17 | 70.9 | 33 |
| | | 10 | 5 | 10.25 | 71.6 | 33.3 |
| 43 | OPPC3 | 0.2 | 5.33 | | | |
| | | 0.4 | 4.58 | | | |
| | | 0.9 | 4.08 | | | |
| | | 1.7 | 4.08 | | | |
| | | 3.3 | 3.83 | 8.75 | 70.7 | 36.2 |
| | | 6.7 | 4.83 | 10.17 | 70.3 | 36.4 |
| | | 10 | 5 | 11.17 | 69.3 | 37.1 |
| 44 | OPPC6 | 0.2 | 4.92 | | | |
| | | 0.4 | 3.42 | | | |
| | | 0.9 | 3.67 | | | |
| | | 1.7 | 4.42 | | | |
| | | 3.3 | 4.58 | 10.33 | 68.1 | 35 |
| | | 6.7 | 5.75 | 12.58 | 69 | 35.9 |
| | | 10 | 7.08 | 14.75 | 69.4 | 34.3 |
| 45 | OPPC5 | 0.2 | 5.5 | | | |
| | | 0.4 | 3.75 | | | |
| | | 0.9 | 4.33 | | | |
| | | 1.7 | 4.83 | | | |
| | | 3.3 | 5.08 | 11.17 | 68.6 | 34.7 |
| | | 6.7 | 6.58 | 13.42 | 69.5 | 34.7 |
| | | 10 | 7.17 | 14.83 | 69.1 | 34.8 |
| 46 | NaTMP + OPPC2 | 6.7 + 0.2 | 3.25 | 8 | 71.5 | 36.6 |

As seen in Table 1, among the additives that were evaluated, conventional coating agents, dispersants, and soap had no effect on the hydration rate of the calcined gypsum. Meanwhile, soluble salts, normal retarders, and inorganic acids had a negative effect on the rate of hydration of the calcined gypsum such that they acted as retarders. Inorganic phosphates, such as sodium trimetaphosphate, had a positive effect on the rate of hydration of the calcined gypsum and served as accelerators. Organic phosphonates exhibited the strongest positive effect on hydration and also were accelerators. Based on acceleration effectiveness, additive cost, and maintaining efficiency, a combination of organic phosphonic compound and phosphate-containing compound is preferred.

EXAMPLE 2

EFFICIENCY OF WET GYPSUM ACCELERATOR OVER TIME

This Example illustrates the efficiency of the wet gypsum accelerator of the invention over time.

For each test, 1 g CSA and 2 g wet gypsum accelerator containing a combination of 0.5 wt. % NaTMP and 0.5 wt. % of OPPC2, in accordance with the present invention, were prepared as described in Example 1. Both of the accelerators were tested on the day they were prepared (Day 1) to determine rate of hydration. Another sample of WGA was stored in a sealed drum and then tested on 232 days later (day 233) to evaluate the efficiency of the WGA over time. In the hydration tests, 200 grams of calcium sulfate hemihydrate (United States Gypsum Company's Southard Plant), the accelerator, and 240 grams of water were mixed and tested for hydration, except that the powdered mixture was soaked for 5 seconds and mixed for 7 seconds. The results are shown in Table 2.

TABLE 2

Efficiency of Wet Gypsum Accelerator Over Time

| Accelerator | Time to 50% Hydration | Time to 98% Hydration | Initial Slurry Temp. (° F.) | Total Temp. Rise (° F.) |
|---|---|---|---|---|
| CSA, day 1 | 5 | 9.97 | 71.9 | 30.7 |
| WGA, day 1 | 5.17 | 10.2 | 72.1 | 30.4 |
| WGA, day 233 | 5.83 | 9.08 | 69.4 | 31.3 |

As seen in Table 2, the wet gypsum accelerator according to the invention exhibited a similar "Time to 50% Hydration" as compared with the CSA on day 1. In addition, the wet gypsum accelerator maintained most of its efficiency, even on day 233. While the "Time to 50% Hydration" on day 1 was 5.17, it was 5.83 on day 233, a loss of only 11.3%.

All of the references cited herein, including patents, patent applications, and publications, are hereby incorporated in their entireties by reference.

While this invention has been described with an emphasis upon preferred embodiments, it will be apparent to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of hydrating calcined gypsum to form an interlocking matrix of set gypsum comprising:
    forming a mixture of calcined gypsum, water, and a wet gypsum accelerator, said wet gypsum accelerator comprising particles of calcium sulfate dihydrate, water, and at least one additive selected from the group consisting of:
    (i) an organic phosphonic compound;
    (ii) a phosphate-containing compound; and
    (iii) a mixture of (i) and (ii).

2. The method of claim 1, wherein the Time to 50% Hydration of the calcined gypsum is about 8 minutes or less.

3. The method of claim 1, wherein the Time to 50% Hydration of the calcined gypsum i about 5 minutes or less.

4. The method of claim 1, wherein the calcium sulfate dihydrate particles have an average particle size of about 5 μm or less.

5. The method of claim 1, wherein the additive is present in an amount of from about 0.1% to about 10% by weight of said accelerator.

6. The method of claim 1, wherein the additive is a mixture of at least one organic phosphonic compound and at least one phosphate-containing compound, wherein the organic phosphonic compound is present in an amount of from about 0.05% to about 9.95% by weight of said accelerator, and wherein the phosphate-containing compound is present in an amount of from about 0.05% to about 9.95% by weight of said accelerator.

7. The method of claim 1, wherein the calcium sulfate dihydrate is present in an amount of at least about 40% by weight of said accelerator.

8. The method of claim 1, wherein the water is present in an amount of from about 40% to about 55% by weight of said accelerator.

9. The method of claim 1, wherein said organic phosphonic compound is selected from the group consisting of aminotri (methylene-phosphonic acid), aminotri (methylene-phosphonic acid), 1-hydroxyethylidene-1,1-diphosphonic acid, 1-hydroxyethylidene-1,1-diphosphonic acid, diethylenetriamine penta(methylene phosphonic acid), diethylenetriamine penta(methylene phosphonic acid), hexamethylene diamine tetra(methylene phosphonic acid), hexamethylene diamine tetra(methylene phosphonic acid), a pentasodium salt, trisodium salt, tetrasodium salt, sodium salt, ammonium salt, potassium salt, calcium salt, or magnesium salt of any of the foregoing acids, and combinations thereof.

10. The method of claim 1, wherein the phosphate-containing compound is selected from the group consisting of orthophosphates, polyphosphates, and combinations thereof.

11. The method of claim 1, wherein the phosphate-containing compound is selected from the group consisting of tetrapotassium pyrophosphate, sodium acid pyrophosphate, sodium tripolyphosphate, tetrasodium pyrophosphate, sodium potassium tripolyphosphate, sodium hexametaphosphate salt having from 6 to about 27 phosphate units, ammonium polyphosphate, sodium trimetaphosphate, and combinations thereof.

* * * * *